US011838270B1

(12) United States Patent
Karppanen

(10) Patent No.: US 11,838,270 B1
(45) Date of Patent: Dec. 5, 2023

(54) SESSION CONTROL MANAGEMENT FOR VIRTUAL PRIVATE NETWORKS USING ARTIFICIAL DATA PACKETS

(71) Applicant: Amazon Technologies, Inc., Seattle, WA (US)

(72) Inventor: Jari Karppanen, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 837 days.

(21) Appl. No.: 16/143,327

(22) Filed: Sep. 26, 2018

(51) Int. Cl.
*H04L 29/06* (2006.01)
*H04L 9/40* (2022.01)
*H04L 69/16* (2022.01)

(52) U.S. Cl.
CPC ...... *H04L 63/0272* (2013.01); *H04L 63/0876* (2013.01); *H04L 69/161* (2013.01)

(58) Field of Classification Search
CPC ............. H04L 63/0272; H04L 63/0876; H04L 69/161
See application file for complete search history.

(56) References Cited

U.S. PATENT DOCUMENTS

| | | | | |
|---|---|---|---|---|
| 2006/0155842 A1* | 7/2006 | Yeung | ................. | G06F 21/6245 709/224 |
| 2014/0337957 A1* | 11/2014 | Feekes | ................ | H04L 63/0861 726/9 |
| 2016/0301713 A1* | 10/2016 | Krishnamachari | ..... | H04L 63/18 |
| 2019/0173849 A1* | 6/2019 | Lapidous | ............ | H04L 63/0428 |

OTHER PUBLICATIONS

Dierks, T., et al., "The TLS Protocol Version 1.0," Request for Comments: 2246, Standards Track, Jan. 1999, 75 pages.
Newman, C., "Using TLS with IMAP, POP3 and ACAP," Request for Comments: 2595, Standards Track, Jun. 1999, 16 pages.
Medvinsky, A., et al., "Addition of Kerberos Cipher Suites to Transport Layer Security (TLS)," Request for Comments: 2712, Standards Track, Oct. 1999, 7 pages.
Khare, R., et al., "Upgrading to TLS Within HTTP/1.1," Request for Comments: 2817, Standards Track, May 2000, 13 pages.
Rescorla, E., "HTTP Over TLS," Request for Comments: 2818, Informational, May 2000, 8 pages.

(Continued)

*Primary Examiner* — Joseph P Hirl
*Assistant Examiner* — Chi D Nguy
(74) *Attorney, Agent, or Firm* — Davis Wright Tremaine LLP

(57) ABSTRACT

A client device generates an artificial data packet that specifies, in the header, an artificial network address usable to indicate that the artificial data packet includes out-of-band data. The client device transmits the artificial data packet with other data packets over an encrypted data stream to a virtual private network server. The virtual private network server determines, based on the artificial network address, that the artificial data packet includes out-of-band data. The virtual private network server processes the out-of-band data from the artificial data packet while transmitting the other data packets to servers corresponding to destination network addresses specified in the headers of these other data packets.

20 Claims, 7 Drawing Sheets

(56) References Cited

OTHER PUBLICATIONS

Hoffman, P., "SMTP Service Extension for Secure SMTP over Transport Layer Security," Request for Comments: 3207, Standards Track, Feb. 2002, 9 pages.
Chown, P., "Advanced Encryption Standard (AES) Ciphersuites for Transport Layer Security (TLS)," Request for Comments: 3268, Standards Track, Jun. 2002, 8 pages.
Blake-Wilson, S., et al., "Transport Layer Security (TLS) Extensions," Request for Comments: 3546, Standards Track, Jun. 2003, 28 pages.
Hollenbeck, S., "Transport Layer Security Protocol Compression Methods," Request for Comments: 3749, Standards Track, May 2004, 8 pages.
Friend, R., "Transport Layer Security (TLS) Protocol Compression Using Lempel-Ziv-Stac (LZS)," Request for Comments: 3943, Informational, Nov. 2004, 13 pages.
Moriai, S., et al., "Addition of Camellia Cipher Suites to Transport Layer Security (TLS)," Request for Comments: 4132, Standards Track, Jul. 2005, 8 pages.
Lee, H.J., et al., "Addition of SEED Cipher Suites to Transport Layer Security (TLS)," Request for Comments: 4162, Standards Track, Aug. 2005, 7 pages.
Ford-Hutchinson, P., "Securing FTP with TLS," Request for Comments: 4217, Standards Track, Oct. 2005, 29 pages.
Eronen, P., and H. Tschofenig, "Pre-Shared Key Ciphersuites for Transport Layer Security (TLS)," Request for Comments: 4279, Standards Track, Dec. 2005, 16 pages.
Rescorla, E., and N. Modadugu, "Datagram Transport Layer Security," Request for Comments: 4347, Standards Track, Apr. 2006, 26 pages.
Blake-Wilson, S., et al., "Transport Layer Security (TLS) Extensions," Request for Comments: 4366, Standards Track, Apr. 2006, 29 pages.
Blake-Wilson, S., et al., "Elliptic Curve Cryptography (ECC) Cipher Suites for Transport Layer Security (TLS)," Request for Comments: 4492, Informational, May 2006, 36 pages.
Santesson, S., "TLS Handshake Message for Supplemental Data," Request for Comments: 4680, Standards Track, Sep. 2006, 10 pages.
Santesson, S., et al., "TLS User Mapping Extension," Request for Comments: 4681, Standards Track, Oct. 2006, 11 pages.
Blumenthal, U., and P. Goel, "Pre-Shared Key (PSK) Ciphersuites with NULL Encryption for Transport Layer Security (TLS)," Request for Comments: 4785, Standards Track, Jan. 2007, 6 pages.
Taylor, D., et al., "Using the Secure Remote Password (SRP) Protocol for TLS Authentication," Request for Comments: 5054, Informational, Nov. 2007, 25 pages.
Salowey, J., et al., "Transport Layer Security (TLS) Session Resumption without Server-Side State," Request for Comments: 5077, Standards Track, Jan. 2008, 21 pages.
Mavrogiannopoulos, N., "Using OpenPGP Keys for Transport Layer Security (TLS) Authentication," Request for Comments: 5081, Experimental, Nov. 2007, 9 pages.
Phelan, T., "Datagram Transport Layer Security (DTLS) over the Datagram Congestion Control Protocol (DCCP)," Request for Comments: 5238, Standards Track, May 2008, 11 pages.
Dierks, T., and E. Rescorla, "The Transport Layer Security (TLS) Protocol Version 1.2," Request for Comments: 5246, Standards Track, Aug. 2008, 98 pages.
Salowey, J., et al., "AES Galois Counter Mode (GCM) Cipher Suites for TLS," Request for Comments: 5288, Standards Track, Aug. 2008, 9 pages.
Rescorla, E., "TLS Elliptic Curve Cipher Suites with SHA-256/384 and AES Galois Counter Mode (GCM)," Request for Comments: 5289, Informational, Aug. 2008, 7 pages.
Rescorla, E., et al., "Transport Layer Security (TLS) Renegotiation Indication Extension," Request for Comments: 5746, Standards Track, Feb. 2010, 16 pages.
McGrew, D., and E. Rescorla, "Datagram Transport Layer Security (DTLS) Extension to Establish Keys for the Secure Real-time Transport Protocol (SRTP)," Request for Comments: 5764, Standards Track, May 2010, 27 pages.
Brown, M., and R. Housley, "Transport Layer Security (TLS) Authorization Extensions," Request for Comments: 5878, Experimental, May 2010, 19 pages.
Kato, A., et al., "Camellia Cipher Suites for TLS," Request for Comments: 5932, Standards Track, Jun. 2010, 7 pages.
Tuexen, M., et al., "Datagram Transport Layer Security (DTLS) for Stream Control Transmission Protocol (SCTP)," Request for Comments: 6083, Standards Track, Jan. 2011, 10 pages.
Eastlake, D., "Transport Layer Security (TLS) Extensions: Extension Definitions," Request for Comments: 6066, Standards Track, Jan. 2011, 25 pages.
Mavrogiannopoulos, N., and D. Gillmor, "Using OpenPGP Keys for Transport Layer Security (TLS) Authentication," Request for Comments: 6091, Informational, Feb. 2011, 9 pages.
Turner, S., and T. Polk, "Prohibiting Secure Sockets Layer (SSL) Version 2.0," Request for Comments: 6176, Standards Track, Mar. 2011, 4 pages.
Kim, W., et al., "Addition of the ARIA Cipher Suites to Transport Layer Security (TLS)," Request for Comments: 6209, Informational, Apr. 2011, 10 pages.
Rescorla, E., and N. Modadugu, "Datagram Transport Layer Security Version 1.2," Request for Comments: 6347, Standards Track, Jan. 2012, 33 pages.
Kanno, S., and M. Kanda, "Addition of the Camellia Cipher Suites to Transport Layer Security (TLS)," Request for Comments: 6367, Informational, Sep. 2011, 9 pages.
Salter, M., and R. Housley, "Suite B Profile for Transport Layer Security (TLS)," Request for Comments: 6460, Informational, Jan. 2012, 15 pages.
McGrew, D., and D. Bailey, "AES-CCM Cipher Suites for Transport Layer Security (TLS)," Request for Comments: 6655, Standards Track, Jul. 2012, 8 pages.
Merkle, J., and M. Lochter, "Elliptic Curve Cryptography (ECC) Brainpool Curves for Transport Layer Security (TLS)," Request for Comments: 7027, Informational, Oct. 2013, 11 pages.
Gutmann, P., "Encrypt-then-MAC for Transport Layer Security (TLS) and Datagram Transport Layer Security (DTLS)," Request for Comments: 7366, Standards Track, Sep. 2014, 7 pages.
Arkko, J., et al., "IPv4 Address Blocks Reserved for Documentation," Request for Comments: 5737, Informational, Jan. 2010, 5 pages.
Mogul, J., "Broadcasting Internet Datagrams," Request for Comment: 919, Standards Track, Oct. 1984, 9 pages.
Reynolds, J., et al., "Assigned Numbers," Request for Comments: 1700, Standards Track, Oct. 1994, 231 pages.
Rekhter, Y., et al., "Address Allocation for Private Internets," Request for Comments: 1918, Best Current Practice, Feb. 1996, 10 pages.
Bradner, S., et al., "Benchmarking Methodology for Network Interconnect Devices," Request for Comments: 2544, Informational, Mar. 1999, 32 pages.
Huitema, C., "An Anycast Prefix for 6to4 Relay Routers," Request for Comments: 3068, Standards Track, Jun. 2001, 10 pages.
Reynolds, J., "Assigned Numbers: RFC 1700 is Replaced by an On-line Database," Request for Comments: 3232, Informational, Jan. 2002, 4 pages.
Cheshire, S., et al., "Dynamic configuration of IPv4 Link-Local Addresses," Request for Comments: 3927, Standards Track, May 2005, 34 pages.
Cotton, M., et al., "IANA guidelines for IPv4 Multicast Address Assignments," Request for Comments: 5771, Best Current Practice, Mar. 2010, 12 pages.
Asati, R., et al., "Device Reset Characterization," Request for Comments: 6201, Informational, Mar. 2011, 18 pages.
Weil, J., et al., "IANA-Reserved IPv4 Prefix for shared Address Space," Request for Comments: 6598, Best Current Practice, Apr. 2012, 12 pages.
Cheshire, S., et al., "Special-Use Domain Names," Request for Comments: 6761, Standards Track, Feb. 2013, 14 pages.

(56) References Cited

OTHER PUBLICATIONS

Bradner, S., et al., "Applicability Statement for RFC 2544: Use on Production Networks Considered Harmful," Request for Comments: 6815, Informational, Nov. 2012, 12 pages.
Cotton, M., et al., "Special-Purpose IP Address Registries," Request for Comments: 6890, Best Current Practice, Apr. 2013, 24 pages.
Troan, O., et al., "Seprecating the Anycast Prefix for 6to4 Relay Routers," Request for Comments: 7526, Best Current Practice, May 2015, 11 pages.
Bonica, R., et al., "Updates to the Special-Purpose IP Address Registries," Request for Comments: 8190, Best Current Practice, Jun. 2017, 7 pages.

\* cited by examiner

SESSION CONTROL MANAGEMENT FOR VIRTUAL PRIVATE NETWORKS USING ARTIFICIAL DATA PACKETS

BACKGROUND

Virtual private networks (VPN) are utilized extensively to enable users to exchange data securely and anonymously over a public communications network, such as the Internet. For instance, information transmitted between a client device and a VPN server is encrypted and transmitted over an encrypted data stream within the VPN, thereby preventing unauthorized users from being able to intercept the data being transmitted over the encrypted data stream, as they lack access to the cryptographic key required to decrypt the data. One way of managing a connection between a client device and a VPN server involves using two separate Transmission Control Protocol (TCP) connections, one for control tasks such as authentication, authorization and session establishment/management and another for application data. Such a solution, however, involves complex logic to manage the two connections and manage flow control to prevent various issues. For example, a packet sent via first channel might arrive out-of-order from second channel's point of view and channels might disconnect separately.

BRIEF DESCRIPTION OF THE DRAWINGS

Various techniques will be described with reference to the drawings, in which.

DETAILED DESCRIPTION

Figure 1:
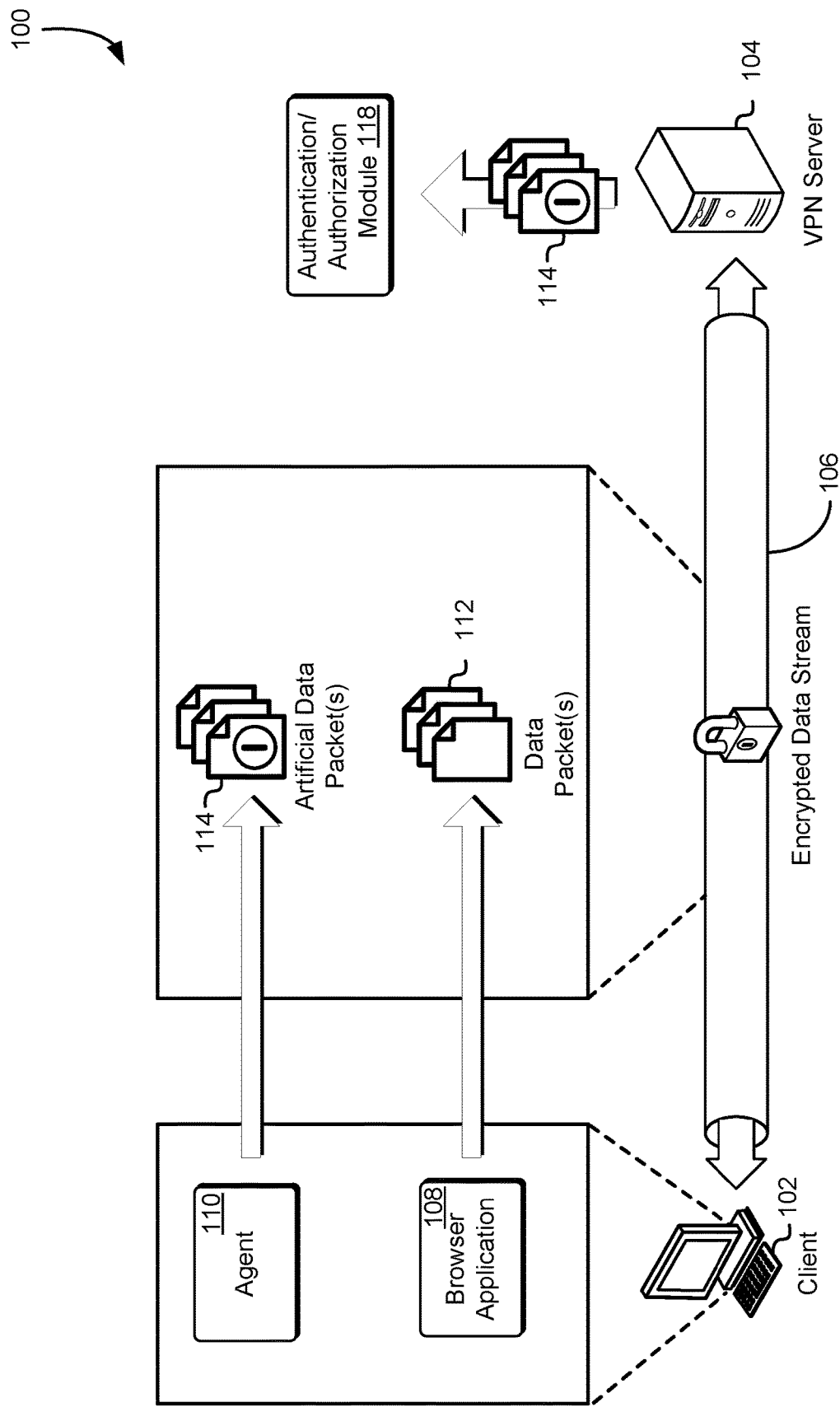
FIG. 1 shows an illustrative example of a system in which various embodiments can be implemented.

Techniques described and suggested herein relate to the use of a virtual network interface to generate artificial User Datagram Protocol (UDP) network traffic to enable transmission of artificial data packets with other data packets over an encrypted data stream of a VPN. In an example, an agent application operating on a client device generates artificial data packets for controlling authentication and authorization of users of the client device. These artificial data packets may be utilized to communicate out-of-band data for authentication, authorization, and session establishment/management between the agent application and a VPN server. The agent application may transmit the newly generated artificial data packets to a virtual network interface of the client device for processing prior to transmission to the VPN server of an encrypted data stream of the VPN.

In an example, the virtual network interface obtains the artificial data packets from the agent application of the client device. The virtual network interface identifies, for each artificial data packet or for the set of artificial data packets, an artificial IP destination address to be inserted into the header of each artificial data packet. The artificial IP destination address may be selected from a range of artificial IP destination addresses selected by the client device and the VPN server during a handshake process for generating the encrypted data stream between the client device and the VPN server. Additionally, the virtual network interface may identify an artificial port that is not being utilized by the client device or the VPN server. Selection of the artificial port may be performed in a similar manner to that of the artificial IP destination address range (e.g., during the handshake process for generating the encrypted data stream, etc.). The virtual network interface may utilize the selected artificial IP address and port identifier to update the header of each artificial data packet. Thus, by updating the header, the artificial data packets may mimic data packets originating from a real client device application. The virtual network interface may transmit the artificial data packets to a socket of the client device to transmit the artificial data packets from the client device to the VPN server.

In an example, the VPN server includes a data packet processing module that directs data packets obtained over the encrypted data stream and through a socket of the VPN server to applications and modules of the VPN server based on the destination IP address of each data packet. The data packet processing module may evaluate the destination IP address of an artificial data packet and determine that the destination IP address specified in the header of the artificial data packet is an artificial IP address. For instance, the data packet processing module may maintain a database specifying a range of artificial IP addresses that may serve as an indication that the data packet having any of these artificial IP addresses in its header includes out-of-band data for authentication, authorization, session establishment/management, etc. If the destination IP address specified in the header of an obtained data packet does not correspond to the range of artificial IP addresses and is otherwise not a valid IP address, the data packet processing module may indicate that the destination IP address is unreachable. Alternatively, if the destination IP address is a valid IP address and is not within the range of artificial IP addresses, the data packet processing module may transmit the data packet to a browser application of the VPN server to enable transmission of the data packet to the specified destination IP address.

In an example, if the destination IP address is an artificial IP address from the range of artificial IP addresses specified in the database maintained by the data packet processing module, the data packet processing module may transmit the data packet to an authentication/authorization module of the VPN server for processing. The authentication/authorization module may utilize the data included in the data packet for authentication of requests from the client device, making authorization decisions based on an identity of the user of the client device or on characteristics of the client device itself, perform new handshake processes for establishing additional and/or alternative data streams, and the like.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

As one skilled in the art will appreciate in light of this disclosure, certain embodiments may be capable of achieving certain advantages. For example, because the artificial data packets are modified to include artificial destination IP addresses that may be interpreted as an indication that these data packets are to be processed by an authentication/authorization module, the artificial data packets may be transmitted over an encrypted data stream with other data packets having destination IP addresses corresponding to actual destination servers. This may obviate the need to establish additional network sockets to pass out-of-band data to the VPN server. Further, by generating artificial data packets that include artificial destination IP addresses, the agent application of the client device may transmit these artificial data packets using the flow control mechanism of the encrypted data stream protocol.

FIG. 1 shows an illustrative example of a system 100 in which various embodiments can be implemented. In the system 100, a VPN comprises an encrypted data stream 106 through which data packets may be transmitted from a VPN server 104 to a client device 102, and vice versa, within the VPN. The client device 102, in some embodiments, is a mobile (e.g., portable) computing device (e.g., tablet computers, laptop computers, wearable computers, smartphones, handheld game consoles, portable media players, personal digital assistants, digital media players, etc.) or other computing device (e.g., desktop computers, servers, etc.). The VPN server 104 may be a remote access server that provides the client device 102 with access to the VPN over a public communications network, such as the Internet.

In an embodiment, the client device 102 and the VPN server 104 establish the encrypted data stream 106 for transmission of data between the client device 102 and the VPN server 104 over the encrypted data stream 106. The client device 102 may establish a connection with the VPN server 104 over a communications network, such as the Internet. Once the connection with the VPN server 104 has been established, the client device 102 may establish the encrypted data stream 106. The encrypted data stream 106 may be established subject to a VPN protocol (e.g., Point-to-Point Tunneling Protocol (PPTP), Layer Two Tunneling Protocol (L2TP), Internet Protocol Security (IPSec), etc.). Each of the data packets transmitted over the encrypted data stream 106 may be constructed in accordance with the corresponding VPN protocol. Further, each data packet may be encapsulated via encryption of the data packet using an encryption context corresponding to the encrypted data stream 106 through which the data packet is transmitted.

In an embodiment, to establish the encrypted data stream 106, the client device 102 and the VPN server 104 perform a handshake. A handshake may be a process by which two computing entities negotiate parameters of a session and, in the example of FIG. 1, parameters of a session of an encrypted communications session. For instance, in some embodiments, the handshake is a secure socket layer (SSL) handshake or a transport layer security (TLS) handshake. Generally, embodiments of the present disclosure may use various protocols, such as a SSL or TLS protocol and extensions thereto, such as defined in Request for Comments (RFC) 2246, RFC 2595, RFC 2712, RFC 2817, RFC 2818, RFC 3207, RFC 3268, RFC 3546, RFC 3749, RFC 3943, RFC 4132, RFC 4162, RFC 4217, RFC 4279, RFC 4347, RFC 4366, RFC 4492, RFC 4680, RFC 4681, RFC 4785, RFC 5054, RFC 5077, RFC 5081, RFC 5238, RFC 5246, RFC 5288, RFC 5289, RFC 5746, RFC 5764, RFC 5878, RFC 5932, RFC 6083, RFC 6066, RFC 6091, RFC 6176, RFC 6209, RFC 6347, RFC 6367, RFC 6460, RFC 6655, RFC 7027, and RFC 7366, which are incorporated herein by reference, to establish a secure channel. Other protocols implemented below the application layer of the Open Systems Interconnect (OSI) model may also be used and/or adapted to utilize techniques described herein.

In an embodiment, the handshake is performed by the client device 102 and the VPN server 104 to negotiate an encryption context to be used in secure communications over the encrypted data stream 106. In some embodiments, the encryption context is a cryptographic key. For instance, the handshake may be used to negotiate a cryptographic key for use in encrypting and decrypting a data packet transmitted over the encrypted data stream 106. Negotiation of a cryptographic key is a process by which multiple computer systems securely and mutually determine a symmetric cryptographic key that can be used for encryption and decryption. Such negotiations often include use of asymmetric cryptography for the exchange of cryptographic material, such as one or more symmetric cryptographic keys or information from which one or more symmetric cryptographic keys can be derived.

In an embodiment, the handshake is also used to identify a range of artificial destination IP addresses usable to indicate that a data packet includes out-of-band data that is to be processed by an authentication/authorization module 118. The authentication/authorization module 118 is implemented on the VPN server 104 or on another computer system (e.g., other VPN server within the VPN that is connected to the VPN server 104, etc.) using hardware and software and may be executed using executable instructions whose execution by the VPN server 104 or other computer system causes the authentication/authorization module 118 to perform the operations described herein. The authentication/authorization module 118 may process out-of-band data (e.g., data provided by a user of the client device 102 via a different channel than a channel through which a user provides authentication/authorization data to the VPN server 104 or to another entity) to authenticate a user of the client device 102 and/or to determine whether the user of the client device 102 is authorized to perform an operation. For instance, the authentication/authorization module 118 may authenticate a user's identity based on the out-of-band data provided via a data packet, whereby the authentication/authorization module 118 may evaluate the data provided by the user to determine whether it corresponds to authentication information maintained by the authentication/authorization module 118 for the user. The authentication/authorization module 118 may also maintain a set of access control policies usable to determine whether a user of the client device 102 is authorized to perform an operation.

These access control policies, in an embodiment, are collections of permissions associated with a user, a group, a role, an organization, a company, or some other such entity. Each permission, in an embodiment, is associated with a computing resource and specifies whether the entity (also referred to herein as a "principal") is authorized to access that resource, under what conditions access is allowed or denied, and/or what type of access is allowed or denied. In an embodiment, a permission specifies that a user named "USER1" is authorized to access a certain data storage device denoted by identifier "12345." A more detailed permission can specify that USER1 is authorized to only read from resource 12345, but is not authorized to write to resource 12345. A still more detailed permission can specify that USER1 is authorized to read from resource 12345 at any time, but is only authorized to write to resource 12345 between the hours of 9:00 and 9:30 AM. Permissions, in an embodiment, are also associated with classes or collections of resources so that, for example, USER1 has access to a collection of data storage devices, one of which is resource 12345. Principals, in an embodiment, include individual users, accounts, computing resource services, or other principal entities that are allowed or denied access to a computing resource.

The artificial destination IP addresses may be selected from a range of known reserved IP addresses for a particular scope. For example, the range of artificial destination IP addresses selected for transmission of out-of-band data over the encrypted data stream 106 may coincide with the range of IP addresses designated for use in documentation (e.g., 198.51.100.0-198.51.100.255, 203.0.113.0-203.0.113.255, as designated in RFC 5737, which is incorporated herein by reference). Generally, embodiments of the present disclosure may use various artificial IP addresses selected from a set of known reserved IP addresses such as defined in RFC 919, RFC 1700, RFC 1918, RFC 2544, RFC 3068, RFC 3232, RFC 3927, RFC 5737, RFC 5771, RFC 6201, RFC 6598, RFC 6761, RFC 6815, RFC 6890, RFC 7526, and RFC 8190, which are incorporated herein by reference. Alternatively, the artificial IP addresses may be selected from a set of IP addresses of the VPN that are not being utilized within the VPN. These IP addresses may be known to the VPN server 104, which may provide the set of IP addresses not in use in the VPN to the virtual network interface of the client device 102 to enable use of these IP addresses as artificial IP addresses. The VPN server 104 may maintain a database that specifies the selected range of artificial destination IP addresses for use in detecting data packets transmitted over the encrypted data stream 106 that include out-of-band data to be processed by the authentication/authorization module 118. While artificial destination IP addresses and other destination IP addresses are utilized throughout the present disclosure for the purpose of illustration, artificial source IP addresses and other source IP addresses may be used to distinguish data packets 114 that are to be processed by the authentication/authorization module 118 from other data packets 112 destined for other servers via a browser application 116 of the VPN server 104.

In an embodiment, the client device 102 includes an agent application 110 that transmits out-of-band data to the VPN server 104 via the encrypted data stream 106. The agent application 110 is implemented on the client device 102 using hardware and software and may be executed using executable instructions whose execution by the client device 102 causes the agent application 110 to perform the operations described herein. The agent application 110 may establish the VPN through which the client device 102 and the VPN server 104 may communicate via the encrypted data stream 106. Further, the agent application 110 may control authentication/authorization of users of the client device 102. For instance, the agent application 110 may prompt users for credential information usable to authenticate these users and to identify any applicable policies usable to determine whether these users are authorized to perform operations requested by these users. The credential information may be provided out-of-band (e.g., through a separate communication channel other than a communication channel whereby credential information is provided to a server accessible through a public communications network). This enables transmission of out-of-band data corresponding to a session control channel through the encrypted data stream 106 with other data corresponding to another data channel.

The agent application 110, in an embodiment, generates a set of artificial data packets 114 that include out-of-band data usable by the authentication/authorization module 118 for authentication and authorization of a user, as well as for management of the session between the client device 102 and the VPN server 104 or other servers within the VPN. In an embodiment, the artificial data packets 114 are session control data packets which comprise out-of-band data for establishing or maintaining a session control channel of the VPN. Artificial data packets 114 may differ from other data packets 112 transmitted within the VPN in that the artificial data packets 114 each have, in their header, an artificial IP address corresponding to an authentication/authorization module or other entity that can process out-of-band data included in the artificial data packets 114.

Each of the artificial data packets 114 to be transmitted over the encrypted data stream 106 may be constructed in accordance with the corresponding VPN protocol of the encrypted data stream 106. Further, each artificial data packet 114 may be encapsulated via encryption of the artificial data packet 114 using an encryption context corresponding to the encrypted data stream 106 through which the artificial data packet 114 is to be transmitted.

In an embodiment, the agent application 110 transmits the artificial data packets 114 to a virtual network interface of the client device 102. The virtual network interface may be implemented on the client device 102 using hardware and software and may be executed using executable instructions whose execution by the client device 102 causes the virtual network interface to perform the operations described herein. The virtual network interface may obtain the artificial data packets 114 from the agent application 110 and identify one or more artificial destination IP addresses that may be inserted into the header of each of the artificial data packets 114. As noted above, the VPN server 104 may maintain a database that specifies the selected range of artificial destination IP addresses for use in detecting data packets transmitted over the encrypted data stream 106 that include out-of-band data to be processed by the authentication/authorization module 118. Similarly, the virtual network interface of the client device 102 may maintain a database that specifies this selected range of artificial destination IP addresses. The virtual network interface may select one or more artificial destination IP addresses from the database and insert an artificial destination IP address into the header of each of the artificial data packets 114.

The virtual network interface may transmit the artificial data packets 114 to a network socket of the client device 102 to transmit the artificial data packets 114 along with other data packets 112 over the encrypted data stream 106 to the VPN server 104. The network socket is an endpoint of the client device 102 for transmitting and receiving data over the encrypted data stream 106. The network socket of the client device transmits the artificial data packets 114 with other data packets 112 over the encrypted data stream 106 to a network socket of the VPN server 104. The other data packets 112 may be generated by a browser application 108 of the client device 102 for providing data to a destination server accessible through a public communications network, such as the Internet. The browser application 108 is implemented on the client device 102 using hardware and software and may be executed using executable instructions whose execution by the client device 102 causes the browser application 108 to perform the operations described herein. If a user of the client device 102 utilizes the browser application 108 to request access to a particular website, the browser application 108 may generate a data packet 112 that includes data corresponding to the request of the user (e.g., client device 102 information, user information, the data requested by the user, etc.). Further, the browser application 108 may identify the destination IP address of the server corresponding to the requested website and the server's port number. Thus, the destination IP address and port number specified in the header of each data packet 112 may correspond to an actual server as opposed to the artificial IP address and port number specified in the header of each artificial data packet 114.

The network socket of the client device 102 transmits the artificial data packets 114 from the agent application 110 and the other data packets 112 from the browser application 108 to the VPN server 104. In an embodiment, the network socket of the VPN server 104 obtains the artificial data packets 114 and the other data packets 112 and transmits the artificial data packets 114 and the other data packets 112 to a data packet processing module of the VPN server 104. Similar to the network socket of the client device 102, the network socket of the VPN server 104 is an endpoint of the VPN server 104 for transmitting and receiving data over the encrypted data stream 106. The data packet processing module is implemented on the VPN server 104 using hardware and software and may be executed using executable instructions whose execution by the VPN server 104 causes the data packet processing module to perform the operations described herein. The data packet processing module may maintain a database of artificial IP addresses and port numbers that may be used to indicate that a data packet is to be provided to the authentication/authorization module 118. For instance, the data packet processing module may query a database of artificial IP addresses to identify the true destination for an artificial data packet 114. For example, the artificial IP address specified in the header of the artificial data packet 114 may correspond to an actual IP address or other network address of the authentication/authorization module 118 or of another computer system within the VPN.

The data packet processing module may evaluate the artificial data packets 114 obtained over the encrypted data stream 106 and identify the artificial IP addresses and corresponding port numbers specified in the header of the artificial data packets 114. If the artificial IP addresses and port numbers specified in the header of each artificial data packet 114 correspond to artificial IP addresses and port numbers specified in the database, the data packet processing module may transmit the artificial data packets 114 to the authentication/authorization module 118 or to another computer system capable of processing out-of-band data for processing.

For the other data packets 112, the data packet processing module may evaluate the header of each of these other data packets 112 and determine that the destination IP address and port number do not correspond to any of the artificial IP addresses and port numbers specified in the database. As a result, the data packet processing module may determine whether the specified destination IP address and port correspond to an actual destination server. For instance, the data packet processing module may transmit the other data packets 112 to a browser application 116 of the VPN server 104. The browser application 116 may be implemented on the VPN server 104 using hardware and software and may be executed using executable instructions whose execution by the VPN server 104 causes the browser application 116 to perform the operations described herein. For instance, the browser application 116 may route the other data packets 112 to the destination IP address and port specified in the header of each data packet 112. The browser application 116 may obtain data from a server or other entity associated with the destination IP address and port. Further, the browser application 116 may generate, from the data obtained from the server or other entity, a set of data packets that may be provided to the browser application 108 of the client device 102 over the encrypted data stream 106. However, if the destination IP address and port do not correspond to a particular server, the browser application 116 may return a response indicating that the destination IP address is unreachable.

In an embodiment, instead of utilizing a virtual network interface to assign an artificial destination IP address and port to each artificial data packet 114, the network tunnel (TUN) interface of the client device 102 assigns the artificial destination IP address and port to each artificial data packet 114. The TUN interface is a software-only virtual network kernel interface that operates at the IP level of the network stack and is used for establishing VPN connections (e.g., connection between the client device 102 and the VPN server 104). The TUN interface of the client device 102 may receive an artificial data packet 114 from the agent application 110 and determine that an artificial destination IP address and port are required in the header. The TUN interface may input the artificial destination IP address and port into the artificial data packets 114 and transmit these, through the network socket and the encrypted data stream 106 to the VPN server 104. If the TUN interface receives data packets 112 from the browser application 108, the TUN interface may determine that artificial destination IP addresses and port numbers are not required. Thus, the TUN interface may pass the data packets 112 to the VPN server 104 through the network socket and encrypted data stream 106 without making any modifications to the header of each data packet 112.

In an embodiment, a TUN interface of the VPN server 104 evaluates incoming data packets obtained through the network socket of the VPN server 104 to determine which data packets may include legitimate destination IP addresses and port numbers. For instance, the TUN interface may determine whether the destination IP address specified in the header of an obtained data packet corresponds to any of the artificial destination IP addresses assigned by the VPN server 104 and client device 102 as being indicative of the data packet including out-of-band data to be processed by the authentication/authorization module 118 or other application/module for authenticating/authorizing a user of the client device 102 and/or maintaining the communications session between the client device 102 and the VPN server 104. The TUN interface may provide the artificial data packets 114 directly to the authentication/authorization module 118 or other application for authenticating/authorizing a user of the client device 102 and/or maintaining the communications session between the client device 102 and the VPN server 104. For all other data packets 112, the TUN interface may provide these other data packets 112 to the browser application 116. Thus, distribution of the artificial data packets 114 may be performed without a data packet processing module of the VPN server 104.

Figure 2:
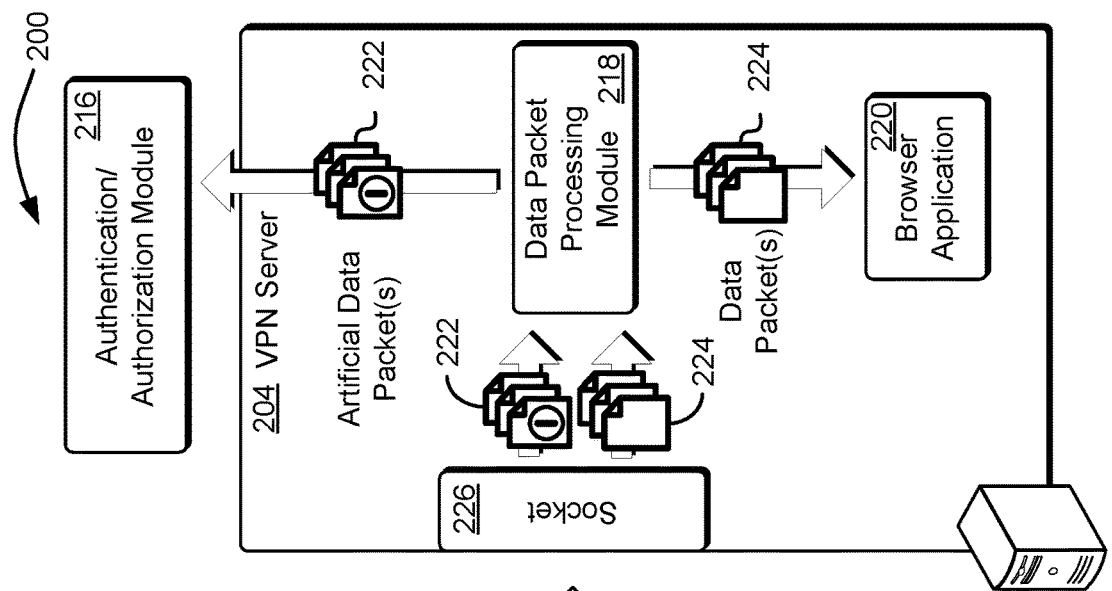
FIG. 2 shows an illustrative example of a system in which artificial data packets having artificial Internet Protocol (IP) addresses are transmitted along with other data packets to a VPN server through an encrypted data stream in accordance with at least one embodiment.
Figure 2:
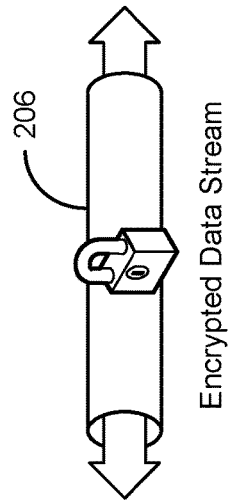

As noted above, an agent application of a client device may generate artificial data packets that may be transmitted over an encrypted data stream along with other data packets to a VPN server. These artificial data packets may be used to authenticate and/or authorize users of the client device and/or to manage or establish a communications session between the client device and the VPN server. To differentiate and properly route these artificial data packets, a virtual network interface of the client device may insert an artificial IP address and port into the header of each artificial data packet. This may cause a data packet processing module of the VPN server to transmit these artificial data packets to an authentication/authorization module or other application/module usable to provide session control over communications between the client device and the VPN server. Accordingly, FIG. 2 shows an illustrative example of a system 200 in which artificial data packets 222 having artificial IP addresses are transmitted along with other data packets 224 to a VPN server 204 through an encrypted data stream 206 in accordance with at least one embodiment.

In the system 200, an agent application 208 generates one or more artificial data packets 222 for delivery to an authentication/authorization module 216 of a VPN server 204 for processing of session control data. The session control data included in the artificial data packets 222 may include credential information of a user of the client device 202 and other out-of-band data usable for session establishment and management for a communications session between the client device 202 and the VPN server 204 over the VPN. The agent application 208 on the client device 202 may configure, with the VPN server 204, the VPN and communications sessions between the client device 202 and the VPN server 204. Further, the agent application 208 may control the authentication and authorization of users of the client device 202. For example, the agent application 208 may prompt a user to provide credential information that may be evaluated by an authentication/authorization module 216 to determine whether the user can be authenticated and, if so, whether the user is authorized to perform operations requested by the user via the client device 202.

In an embodiment, the agent application 208 transmits the artificial data packets 222 to a virtual network interface 210 of the client device 202 to insert an artificial IP address and port number into the header of each artificial data packet 222 to indicate that the artificial data packet 222 is to be delivered to the authentication/authorization module 216. The artificial IP address and port number that may be inserted into the header of each artificial data packet 222 may be either an artificial destination IP address or an artificial source IP address. The artificial IP address may be selected from a range of artificial IP addresses negotiated by the client device 202 and the VPN server 204 during a handshake process for establishing the encrypted data stream 206 between the client device 202 and the VPN server 204. For instance, the client device 202 and the VPN server 204, during the handshake process, may select a range of artificial IP addresses corresponding to a set of reserved IP addresses defined in the RFCs denoted above. Additionally, or alternatively, the client device 202 and the VPN server 204 may select a set of artificial IP addresses corresponding to IP addresses known to be unused or otherwise not related to data requests that may be submitted via the client device 202. For example, if users of the client device 202 are prohibited from accessing gambling websites, the client device 202 and VPN server 204 may select artificial IP addresses corresponding to the IP addresses of known gambling websites. Since users are globally prohibited from accessing gambling websites, the client device 202, via the agent application 208 and the browser application 212, may ensure that no other data packets 224 are generated having a destination IP address of a server associated with any known gambling website.

In response to receiving artificial data packets 222 from the agent application 208, the virtual network interface 210 may select, from a known range of artificial IP addresses and port numbers, an artificial IP address and corresponding port number that may be inserted into the header of each artificial data packet 222. The virtual network interface 210 may maintain a database specifying the different artificial IP addresses and port numbers available for assignment to each of the artificial data packets 222. Thus, the virtual network interface 210 may select, from this database, the artificial IP address and port number to be inserted into the header. In an embodiment, the artificial IP address and port numbers that may be inserted into the header of each artificial data packet 222 are arranged in specific combinations such that only specific combinations of artificial IP addresses and port numbers can be used to indicate that the data packet is to be transmitted to the authentication/authorization module 216. This may enable the data packet processing module 218 of the VPN server 204 determine which data packets may be processed by either the browser application 220 or the authentication/authorization module 216. For example, if the data packet processing module 218 obtains a data packet that has an artificial IP address in the header but has an incorrect port number (e.g., the combination of artificial IP address and port number is not identified as being a proper combination for indicating that the data packet includes out-of-band data, etc.), the data packet processing module 218 may determine that the data packer is invalid. This may cause the data packet processing module 218 to transmit a notification to the client device 202 to indicate that the destination IP address is unreachable or that the data packet is invalid for use.

The virtual network interface 210 may transmit the artificial data packets 222 to a network socket 214 for transmission of the artificial data packets 222 to the VPN server 204 over the encrypted data stream 206. The network socket 214 may obtain, in addition to the artificial data packets 222, other data packets 224 from a browser application 212 and other applications of the client device 202. These other data packets 224 may specify, in their headers, valid (e.g., non-artificial) source and destination IP addresses and port numbers. For instance, each of the other data packets 224 may indicate, in its header, a source IP address and port number corresponding to the client device 202. Further, each of the other data packets 224 may indicate, in its header, a destination IP address and port number corresponding to a server that provides a website or other data accessible over a public communications network, such as the Internet. The browser application 212, for example, may perform a Domain Name System (DNS) lookup query to identify the destination IP address corresponding to a Uniform Resource Identifier (URI) provided by a user via the browser application 212. The browser application 212 may thus translate a URI into a corresponding destination IP address and port number for a server that maintains the domain specified in the URI. The browser application 212 may provide these other data packets 224 to the network socket 214 for transmission of the data packets 224 to a browser application 220 of the VPN server 204, which may obscure the source IP address of the client device 202 and transmit the data packets 224 to the destination IP address.

In an embodiment, the client device 202 utilizes a TUN interface rather than a virtual network interface 210 for inserting artificial IP addresses and port numbers into artificial data packets for transmission over the encrypted data stream 206 to the VPN server 204. The TUN interface, as noted above, is a software-only virtual network kernel interface that operates at the IP level of the network stack and is used for establishing VPN connections (e.g., connection between the client device 202 and the VPN server 204). The TUN interface of the client device 202 may receive an artificial data packet 222 from the agent application 208 and determine that an artificial IP address and port are required in the header. The TUN interface may input the artificial IP address and port into the artificial data packet 222 and transmit the artificial data packet 222 to the network socket 214 for transmission over the encrypted data stream 206 to the VPN server 204.

The network socket 214 may obtain the artificial data packets 222 from the virtual network interface 210 or TUN interface and the other data packets 224 from the browser application 212. In response to obtaining the artificial data packets 222 and the other data packets 224, the network socket 214 may transmit the artificial data packets 222 and the other data packets 224 over the encrypted data stream 206 to the network socket 226 of the VPN server 204. In an embodiment, the artificial data packets 222 and the other data packets 224 are UDP packets that may be transmitted over a communications network. Alternatively, the artificial data packets 222 and other data packets may be generated using the Transmission Control Protocol (TCP) and IP (TCP/IP), resulting in TCP/IP data packets that may be transmitted over a communications network.

The network socket 226 of the VPN server 204 may obtain, via the encrypted data stream 206, the artificial data packets 222 and other data packets 224 transmitted by the client device 202 through its network socket 214. In response to obtaining the artificial data packets 222 and the other data packets 224, the network socket 226 may transmit the artificial data packets 222 and other data packets 224 to a data packet processing module 218. The data packet processing module 218 of the VPN server 204 may evaluate the header of each of the obtained data packets to determine whether to transmit the data packet to an authentication/authorization module 216 or to a browser application 220 of the VPN server 204. For instance, the data packet processing module 218 may query a database that specifies combinations of artificial IP addresses to port numbers to determine whether the source IP address and port number or destination IP address and port number correspond to a combination specified in the database. If so, the data packet processing module 218 may determine that the data packet is an artificial data packet 222 that is to be provided to the authentication/authorization module 216 for processing.

If neither of the source IP address and port number or destination IP address and port number correspond to a combination specified in the database of artificial IP addresses, the data packet processing module 218 may determine whether the specified IP addresses are valid. For instance, the data packet processing module 218 may determine whether the source IP address and port number specified in the header correspond to the client device 202 or otherwise a server through which the client device 202 serves as a conduit for transmitting data packets to the VPN server 204. Similarly, the data packet processing module 218 may determine whether the destination IP address and port number specified in the header are valid. For instance, the data packet processing module 218 may submit a reverse DNS lookup query to determine whether the destination IP address is associated with an active domain and, hence, an active server that may process the data packet. If the data packet processing module 218 determines that the data packet has a valid header and does not specify an artificial IP address and port number, the data packet processing module 218 may transmit the data packet 224 to a browser application 220 of the VPN server 204 for further processing. The browser application 220 may utilize the destination IP address and port number in the header of the data packet 224 to transmit the data packet 224 to the appropriate server associated with the destination IP address and port number.

In an embodiment, the VPN server 204 utilizes a TUN interface to process incoming data packets instead of the data packet processing module 218, as described above. For instance, the TUN interface of the VPN server 204 may evaluate incoming data packets obtained through the network socket 226 to determine which data packets may include legitimate IP addresses and port numbers. The TUN interface may determine whether the destination IP address and port number specified in the header of an obtained data packet corresponds to any of the artificial destination IP addresses assigned by the VPN server 204 and client device 202 as being indicative of the data packet including out-of-band data to be processed by the authentication/authorization module 216. The TUN interface may provide the artificial data packets 222 directly to the authentication/authorization module 216. For all other data packets 224, the TUN interface may provide these other data packets 224 to the browser application 220.

Figure 3:
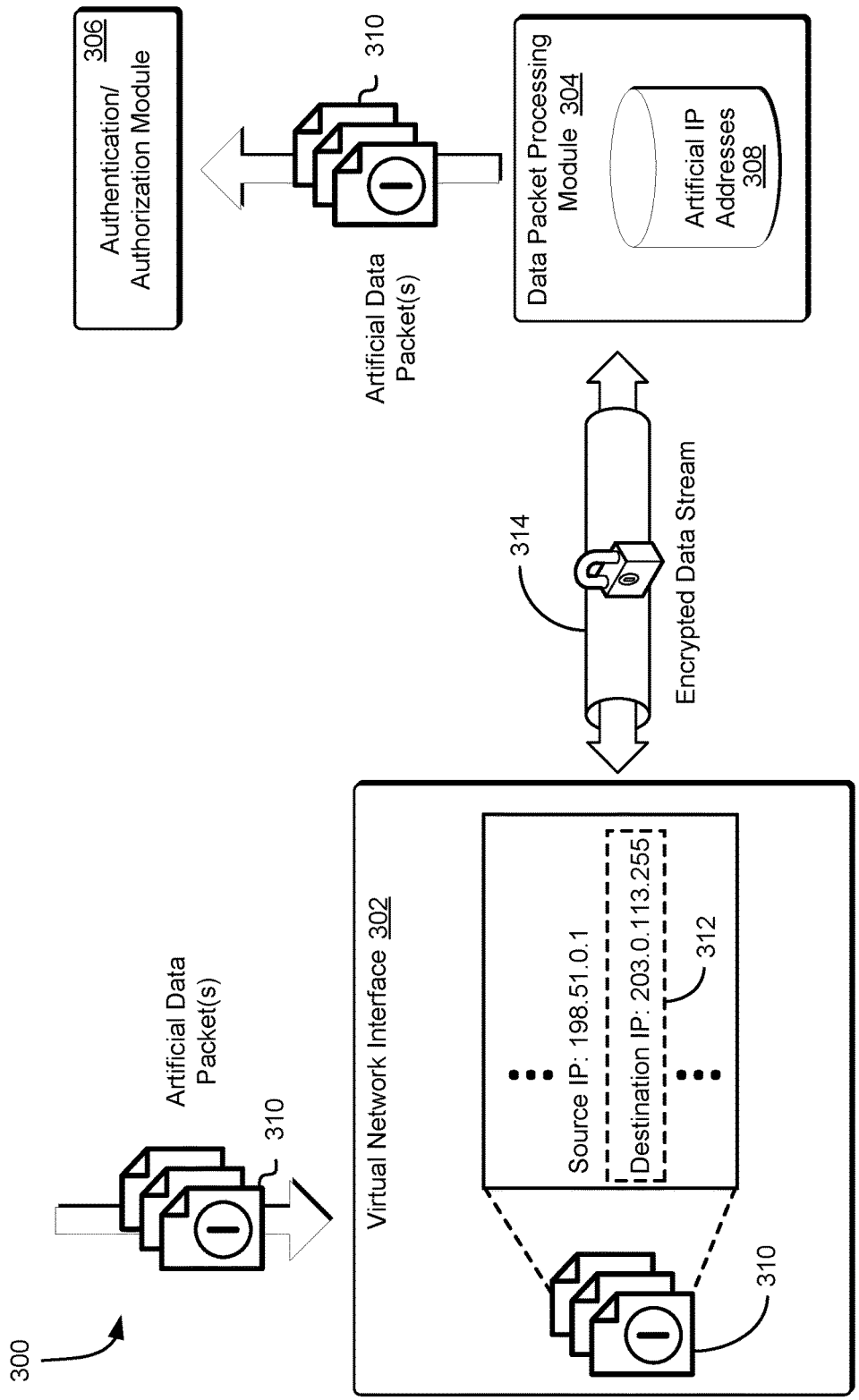
FIG. 3 shows an illustrative example of a system in which a virtual network interface of a client device inserts an artificial IP address into artificial data packets to cause the artificial data packets to be routed to an authentication/authorization module of a VPN server in accordance with at least one embodiment.

As noted above, a virtual network interface of a client device may insert an artificial IP address and port number into the header of an artificial data packet to indicate that the artificial data packet includes out-of-band data to be provided to an authentication/authorization module of a VPN server. The artificial IP address and port number may be selected from a range of artificial IP addresses and port numbers defined by the client device and the VPN server during a handshake process for establishing the communications session between the client device and the VPN server. Accordingly, FIG. 3 shows an illustrative example of a system 300 in which a virtual network interface 302 of a client device inserts an artificial IP address 312 into artificial data packets 310 to cause the artificial data packets 310 to be routed to an authentication/authorization module 306 of a VPN server in accordance with at least one embodiment.

In the system 300, a virtual network interface 302 obtains a set of artificial data packets 310 from an agent application of a client device. The artificial data packets 310 may each include out-of-band data usable for authentication and authorization of users of the client device. Additionally, or alternatively, the artificial data packets 310 may include data usable for establishing and maintaining a communications session between the client device and the VPN server within the VPN. In response to obtaining the set of artificial data packets 310 from the agent application, the virtual network interface 302 identifies a pairing of an artificial IP address 312 and port number that may be inserted into the header of each artificial data packet 310 to indicate that the artificial data packet 310 is to be provided to an authentication/authorization module 306.

In an embodiment, the virtual network interface 302 may obtain the pairing of artificial IP address 312 and port number from a database of artificial IP addresses or other repository (e.g., storage device, cache, etc.) that maintains pairings of artificial IP addresses and port numbers for indicating that an artificial data packet 310 is to be routed to an authentication/authorization module 306. In an embodiment, selection of IP addresses and port numbers to be utilized as artificial IP addresses and port numbers may be performed by the client device and the VPN server during a handshake process for establishing the communications session between the client device and the VPN server. Alternatively, the pairings of artificial IP addresses and port numbers may be hardcoded into the virtual network interface 302 (e.g., included as part of the programmatic instructions of the virtual network interface 302). In an embodiment, the virtual network interface 302 can utilize different artificial IP address ranges to encode artificial data packets for different communications sessions between the client device and the VPN server. Thus, the virtual network interface 302 may evaluate an artificial data packet 310 to identify the applicable communications session for which the data included therein is relevant. This may enable the virtual network interface 302 to select the corresponding range of artificial IP addresses and port numbers.

The virtual network interface 302 may insert, into the header of an artificial data packet 310, the artificial IP address 312 and corresponding artificial port number. The artificial IP address 312 and corresponding artificial port number may be inserted as part of the source IP address or as part of the destination IP address. For instance, rather than specifying the actual source IP address of the client device, the virtual network interface 302 may specify an artificial IP address 312 that is not associated with an actual server or other computing device. Similarly, the virtual network interface 302 may specify as the destination IP address, instead of an actual destination IP address corresponding to a server that maintains a DNS domain, an artificial IP address 312 that is not associated with an actual DNS domain server.

In an embodiment, the virtual network interface 302 inserts, into the header of the artificial data packet 310, an indication that the data packet processing module 304 may use to determine that the data packet processing module 304 is to evaluate the artificial IP address 312 and corresponding artificial port number to determine where to route the artificial data packet 310. The indication may include a plaintext identifier that signals use of an artificial IP address 312 and corresponding artificial port number. Alternatively, the indication may include a digital signature of the virtual network interface 302, which may be verified by the data packet processing module 304 to determine that the artificial IP address 312 and corresponding artificial port number were inserted by the virtual network interface 302 and not by an unauthorized entity.

The virtual network interface 302 may transmit the artificial data packets 310 to a network socket of the client device to cause the network socket to transmit the artificial data packets 310 to the VPN server over an encrypted data stream 314. A network socket of the VPN server may obtain the artificial data packets 310 and transmit the artificial data packets 310 to the data packet processing module 304. The data packet processing module 304 may parse through the obtained data packets to separate the artificial data packets 310 from other data packets destined for a browser application of the VPN server. For instance, the data packet processing module 304 may evaluate each data packet to determine whether the data packet includes an indication that the data packet is an artificial data packet 310. As noted above, the virtual network interface 302 may include a plaintext indicator or a digital signature that may indicate the presence of an artificial IP address and corresponding artificial port number. The data packet processing module 304 may evaluate the plaintext indicator or digital signature to verify that it originated from the virtual network interface 302. If so, the data packet processing module 304 may determine that the data packet is an artificial data packet 310.

In an embodiment, the data packet processing module 304 evaluates each artificial data packet 310 to determine whether the artificial data packets specifies, in its header, an artificial IP address 312 and corresponding artificial port number. For instance, the data packet processing module 304 may query, using the specified source IP address and destination IP address as input, an artificial IP address database 308 to determine whether either the source IP address or destination IP address is specified as being an artificial IP address 312. Further, the data packet processing module 304 may identify, based on the artificial IP address 312 identified from the database 308, a corresponding artificial port number. The combination of artificial IP address 312 and artificial port number may indicate the destination of the artificial data packet 310 for processing of the out-of-band data specified therein. If the combination of the artificial IP address 312 and the artificial port number specified in the header of the artificial data packet 310 corresponds to a combination specified in the database 308, the data packet processing module 304 may transmit the artificial data packet 310 to the authentication/authorization module 306 or to another location corresponding to the combination, as specified in the database 308.

If the artificial IP address 312 specified in the header of the artificial data packet 310 does not correspond to any of the artificial IP addresses specified in the database 308 and/or the combination of the artificial IP address 312 and artificial port number specified in the header of the artificial data packet 310 is not specified in the database 308, the data packet processing module 304 may determine that the artificial data packet 310 is not valid. If so, the data packet processing module 304 may return a response indicating that destination IP address is unreachable. Alternatively, the data packet processing module 304 may return a response to indicate that the artificial data packet 310 could not be processed by the data packet processing module 304.

Figure 4:
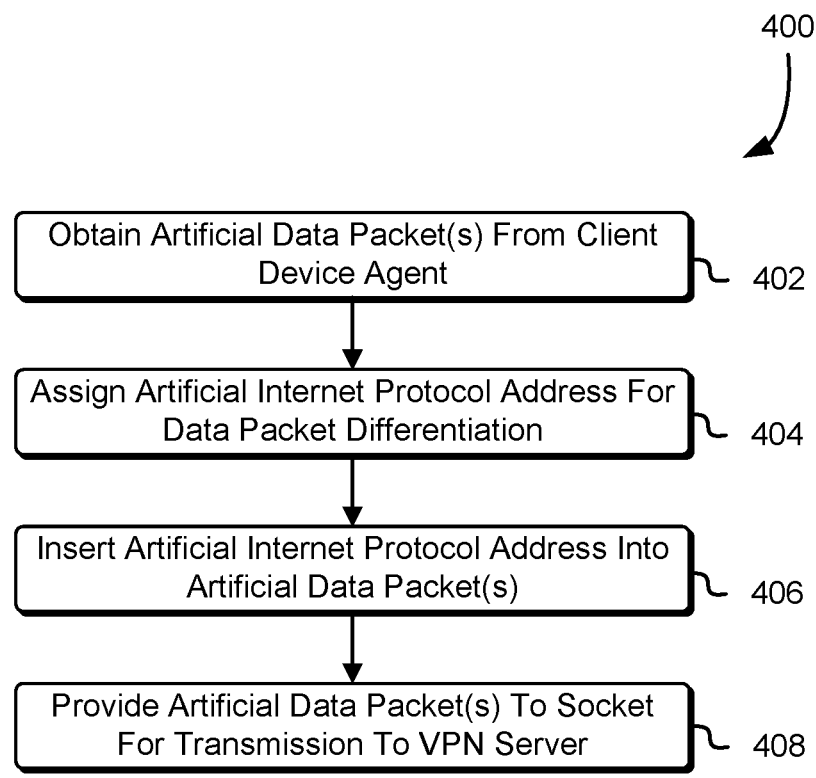
FIG. 4 shows an illustrative example of a process for assigning an artificial IP address into artificial data packets for transmission of the artificial data packets to a VPN server over an encrypted data stream in accordance with at least one embodiment.

As noted above, the client device may include a virtual network interface, which may insert, into the header of each artificial data packet, an artificial IP address and corresponding artificial port number. The artificial IP address and corresponding artificial port number may serve as an indication, to a data packet processing module of a VPN server, that the artificial data packet includes out-of-band data that is to be processed by an authentication/authorization module. Accordingly, FIG. 4 shows an illustrative example of a process 400 for assigning an artificial IP address into artificial data packets for transmission of the artificial data packets to a VPN server over an encrypted data stream in accordance with at least one embodiment. The process 400 may be performed by the aforementioned virtual network interface of the client device, which may insert artificial IP addresses and corresponding artificial port numbers into headers of artificial data packets to cause the artificial data packets to be routed to an authentication/authorization module of a VPN server. In some embodiments, the process 400 can be performed by a TUN interface of the client device, as described above.

At any time, the virtual network interface obtains 402 (receive over a network or from another component of a computer system performing the process in FIG. 4) artificial data packets from an agent application of the client device. The agent application may transmit the artificial data packets to the virtual network interface of the client device to insert an artificial IP address and port number into the header of each artificial data packet to indicate that the artificial data packet is to be delivered to the authentication/authorization module. Each artificial data packet may include out-of-band data usable for authentication and authorization of a user of the client device or of the client device itself. Additionally, or alternatively, the out-of-band data included in each artificial data packet may be used to maintain and/or establish a communications session between the client device and the VPN server.

In response to obtaining the artificial data packets from the agent application, the virtual network interface may assign 404, from a known range of artificial IP addresses and port numbers, an artificial IP address and corresponding port number that may be inserted into the header of each artificial data packet. The virtual network interface may maintain a database specifying the different artificial IP addresses and port numbers available for assignment to each of the artificial data packets. Thus, the virtual network interface may assign 404, from this database, the artificial IP address and port number to be inserted into the header. As noted above, the artificial IP address and port numbers that may be inserted into the header of each artificial data packet may be arranged in specific combinations such that only specific combinations of artificial IP addresses and port numbers can be used to indicate that the data packet is to be transmitted to the authentication/authorization module. This may enable the data packet processing module of the VPN server to determine which data packets may be processed by either the browser application or the authentication/authorization module.

The virtual network interface may insert 406 the artificial IP address and corresponding artificial port number into the artificial data packets. For instance, the virtual network interface may designate the artificial IP address as being the source IP address in the header instead of the IP address of the client device. Alternatively, the virtual network interface may designate the artificial IP address as being the destination IP address for the artificial data packets. The designation of the artificial IP address as either the source IP address or destination IP address may be made based on coordination between the client device and the VPN server during a handshake process or as part of the configuration of the virtual network interface.

The virtual network interface may provide 408 the artificial data packets to a network socket of the client device for transmission of the artificial data packets to the VPN server over the encrypted data stream. The network socket may obtain, in addition to the artificial data packets, other data packets from a browser application and other applications of the client device. These other data packets may specify, in their headers, valid (e.g., non-artificial) source and destination IP addresses and port numbers. Further, each of the other data packets may indicate, in its header, a destination IP address and port number corresponding to a server that provides a website or other data accessible over a public communications network, such as the Internet. The browser application may provide these other data packets to the network socket for transmission of the data packets to a browser application of the VPN server, which may obscure the source IP address of the client device and transmit the data packets to the destination IP address. Thus, the network socket of the client device may transmit both artificial data packets and other data packets over the encrypted data stream to the VPN server.

Figure 5:
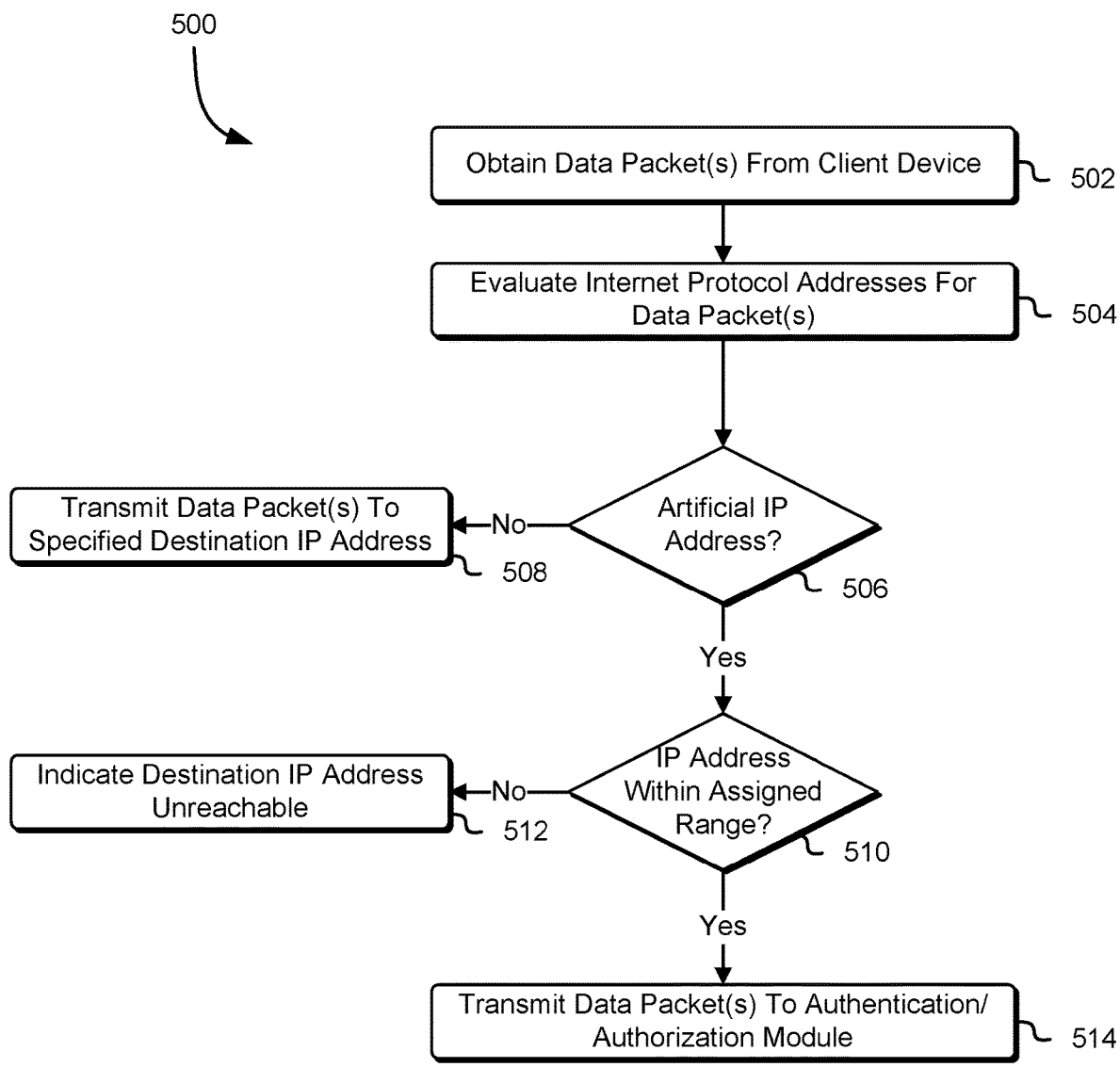
FIG. 5 shows an illustrative example of a process for routing data packets obtained over an encrypted data stream based on IP addresses specified in the header of each data packet in accordance with at least one embodiment.

As noted above, a data packet processing module of a VPN server may evaluate incoming data packets obtained through a network socket of the VPN server to determine whether the header of any of these data packets specify an artificial IP address. The artificial IP address may serve as an indication that the data packet includes out-of-band data or otherwise data that is to be processed by an authentication/authorization module. If the header of a data packet specifies an artificial IP address, the virtual network interface may evaluate the artificial IP address to ensure that it is within a range of artificial IP addresses designated for use in identifying artificial data packets comprising out-of-band data for processing by the authentication/authorization module. Accordingly, FIG. 5 shows an illustrative example of a process 500 for routing data packets obtained over an encrypted data stream based on IP addresses specified in the header of each data packet in accordance with at least one embodiment. The process 500 may be performed by the aforementioned data packet processing module of the VPN server. Alternatively, the process 500 may be performed by a TUN interface of the VPN server, if the VPN server does not include a data packet processing module for processing incoming data packets obtained through a network socket of the VPN server.

The network socket of the VPN server may obtain (receive over a network or from another component of a computer system performing the process in FIG. 5), via the encrypted data stream, the artificial data packets and other data packets transmitted by the client device through its network socket. In response to obtaining the artificial data packets and the other data packets, the network socket may transmit the artificial data packets and other data packets to a data packet processing module. This enables the data packet processing module to obtain 502 (e.g., receive over a network or from another component of a computer system performing the process in FIG. 5) the data packets from the network socket of the VPN server for processing.

The data packet processing module of the VPN server may evaluate 504 the IP addresses specified in the header of each of the obtained data packets to determine whether to transmit the data packet to an authentication/authorization module or to a browser application of the VPN server. Using the IP addresses specified in the header, the data packet processing module may determine 506 whether any of the IP addresses specified in the header include an artificial IP address and corresponding artificial port number. For instance, the data packet processing module may query a database that specifies combinations of artificial IP addresses to port numbers to determine 506 whether the source IP address and port number or destination IP address and port number correspond to a combination specified in the database.

If the header of the data packet does not include an artificial IP address and corresponding artificial port number, the data packet processing module may transmit 508 the data packet to a browser application, which may transmit the data packet to the destination IP address specified in the header. However, if the header of the data packet specifies an artificial IP address, either as the source IP address or the destination IP address, the data packet processing module may determine 510 whether the artificial IP address specified in the header is within an assigned range of IP addresses designated as valid artificial IP addresses. For instance, the data packet processing module may query, using the specified source IP address and destination IP address as input, an artificial IP address database to determine whether either the source IP address or destination IP address is specified as being an artificial IP address. Further, the data packet processing module may identify, based on the artificial IP address identified from the database, a corresponding artificial port number. The combination of artificial IP address and artificial port number may indicate the destination of the artificial data packet for processing of the out-of-band data specified therein. If the combination of the artificial IP address and the artificial port number specified in the header of the artificial data packet corresponds to a combination specified in the database, the data packet processing module may transmit 514 the artificial data packet to the authentication/authorization module or to another location corresponding to the combination, as specified in the database.

However, if the artificial IP address specified in the header of the data packet does not correspond to any of the artificial IP addresses specified in the database and/or the combination of the artificial IP address and artificial port number specified in the header of the artificial data packet is not specified in the database, the data packet processing module may determine that the artificial data packet is not valid. If so, the data packet processing module may return a response to the client device to indicate 512 that destination IP address is unreachable. Alternatively, the data packet processing module may return a response to indicate that the artificial data packet could not be processed by the data packet processing module.

Figure 6:
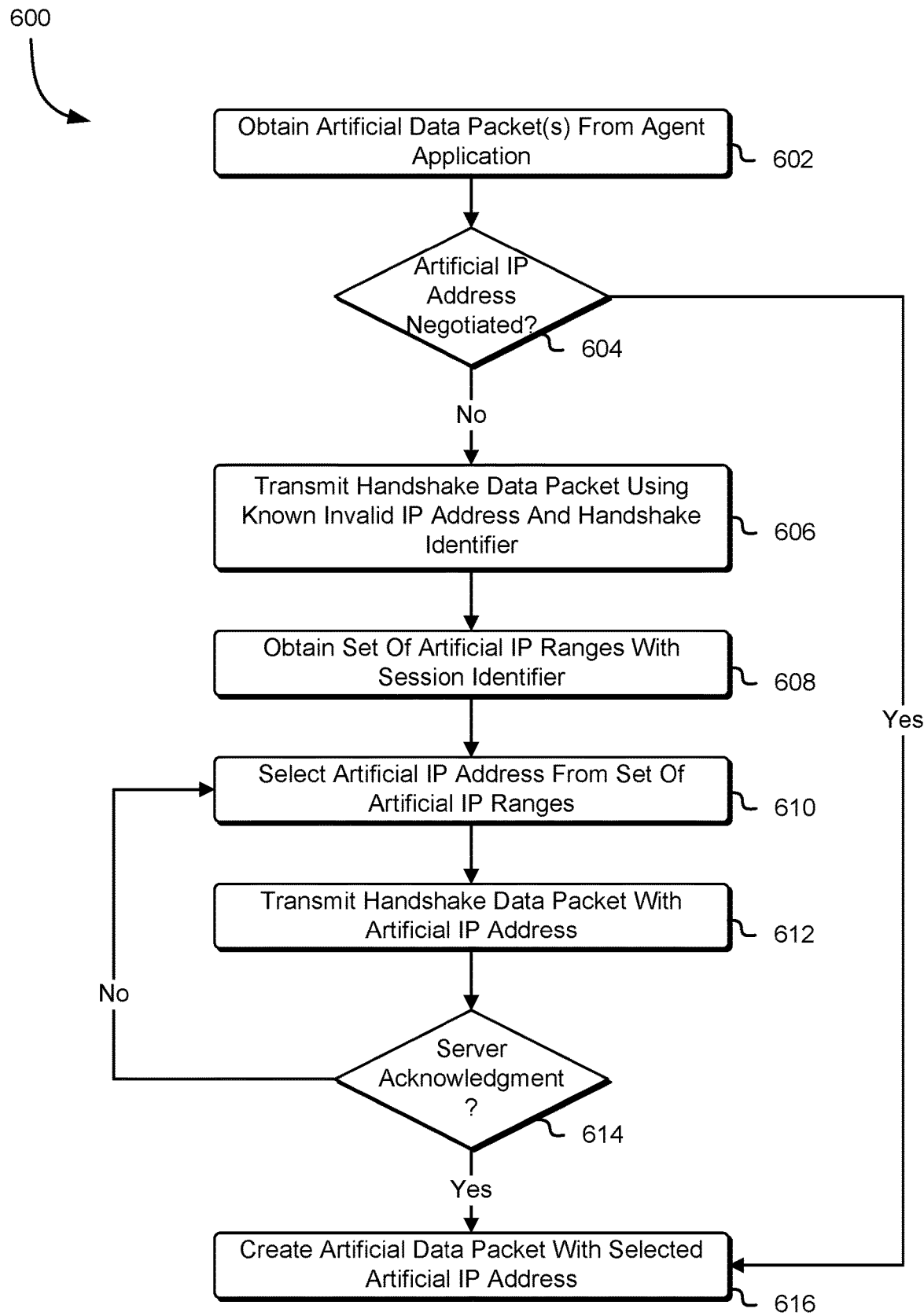
FIG. 6 shows an illustrative example of a process for selecting an artificial IP address for artificial data packets through a handshake process with a client device in accordance with at least one embodiment.

FIG. 6 shows an illustrative example of a process 600 for selecting an artificial IP address for artificial data packets through a handshake process with a client device in accordance with at least one embodiment. The process 600 may be performed by virtual network interface of a client device, which may communicate with a VPN server to establish an encrypted data stream between the client device and the VPN server. The virtual network interface of the client device may also, during a handshake process with the VPN server, negotiate usage of a set of artificial IP addresses for indicating that a data package obtained over the encrypted data stream includes out-of-band data that is to be distributed to an authentication/authorization module.

As noted above, an agent application of a client device generates one or more artificial data packets for delivery to an authentication/authorization module of a VPN server or of another computer system that may be connected to the VPN server over another encrypted data stream of the VPN for processing of out-of-band data. The agent application may transmit the artificial data packets to a virtual network interface of the client device to insert an artificial IP address and port number into the header of each artificial data packet to indicate that the artificial data packet is to be delivered to the authentication/authorization module. Thus, the virtual network interface may obtain 602 (e.g., receive over a network or from another component of a computer system performing the process in FIG. 6) these artificial data packets from the agent application for insertion of the artificial IP address that may indicate, to a data packet processing module of the VPN server, that the artificial data packets are to be transmitted to the authentication/authorization module.

In response to obtaining the artificial data packets from the agent application, the virtual network interface may determine 604 whether the artificial IP address usable to indicate that the artificial data packets comprise out-of-band data has been negotiated with the VPN server during establishment of the encrypted data stream. If the artificial IP address has been previously negotiated, the virtual network interface may create 616 the artificial data packet with the selected artificial IP address. For instance, the virtual network interface may insert the selected artificial IP address as either the source IP address or the destination IP address within the header of each of the artificial data packets to indicate that the artificial data packets comprise out-of-band data and should be routed to an authentication/authorization module.

If the virtual network interface determines that an artificial IP address has not been negotiated with the VPN server, the virtual network interface may transmit 606 a handshake data packet using a known invalid IP address and a handshake identifier. The handshake identifier may be used to indicate that the handshake data packet comprises a request to establish a set of artificial IP addresses that may be used to identify artificial data packets from the virtual network interface. The handshake identifier may include plaintext that states that the handshake data packet comprises a request to establish a set of artificial IP addresses for use by the virtual network interface in identifying artificial data packets for transmission to the VPN server. Alternatively, the handshake identifier may include a digital signature of the virtual network interface, which the VPN server may use to verify that the handshake data packet was provided by the virtual network interface for the purpose of establishing a set of artificial IP addresses. The invalid IP address may be selected from a set of IP addresses known by the virtual network interface and the VPN server to be invalid. For example, the invalid IP address may be selected from a set of reserved IP addresses as specified in the RFCs described above.

In response to obtaining the handshake data packet from the virtual network interface, the data packet processing module of the VPN server may identify a set of artificial IP ranges that may be used to indicate that a data packet includes out-of-band data that is to be processed by an authentication/authorization module or any other computer system or application that may process out-of-band data from the client device. The data packet processing module may provide the set of artificial IP ranges to the virtual network interface in response to the request specified in the handshake data packet. Further, the data packet processing module may transmit a session identifier that may be used to indicate that the artificial IP address in a data packet serves as an indication that the data packet includes out-of-band data. This may prevent the data packet processing module from discarding or otherwise rejected a data packet that includes an artificial IP address. In an embodiment, the set of artificial IP ranges correspond to particular recipients that are capable of processing out-of-band data. For example, a set of artificial IP ranges may correspond to an authentication/authorization module while a different set of artificial IP ranges may correspond to an application or other computer system that may process out-of-band data usable for management of the session control channel. The virtual network interface may obtain 608 (e.g., receive over a network or from another component of a computer system performing the process in FIG. 6) the set of artificial IP ranges and the session identifier from the VPN server over the VPN.

The virtual network interface may select 610 an artificial IP address from the set of artificial IP ranges obtained from the VPN server for insertion into the header of each of the artificial data packets from the agent application. The virtual network interface may select the artificial IP address based on the out-of-band data that is included in the artificial data packet. For instance, if the out-of-band data includes credential information of a user of the client device that is to be processed by the authentication/authorization module, the virtual network interface may select an artificial IP address that may cause the data packet processing module of the VPN server to determine that the data packet is to be provided to the authentication/authorization module for processing the out-of-band data.

The virtual network interface may insert the artificial IP address into the header of a new handshake data packet that may be provided to the VPN server to negotiate use of the artificial IP address for transmitting artificial data packets to the VPN server. Thus, the virtual network interface may transmit 612 a handshake data packet that specifies the proposed artificial IP address to the VPN server over the VPN. In response to transmitting the handshake data packet to the VPN server, the virtual network interface may obtain a response from the VPN server. Based on this response, the virtual network interface may determine 614 whether a server acknowledgment has been received that indicates approval of the artificial IP address for use in transmitting artificial data packets to the VPN server. If the virtual network interface does not receive a server acknowledgement indicating that the selected artificial IP address may be used for indicating that a data packet is an artificial data packet, the virtual network interface may select 610 another artificial IP address from the set of artificial IP ranges and transmit 612 a new handshake data packet with the newly selected artificial IP address.

If the virtual network interface obtains a server acknowledgment that indicates acceptance of the selected artificial IP address, the virtual network interface may create 616 an artificial data packet with the selected artificial IP address. For instance, the virtual network interface may modify the header of each artificial data packet obtained from the agent application to include the artificial IP address. The virtual network interface may insert the artificial IP address as either the source IP address or the destination IP address within the header. Further, in some instances, the virtual network interface may include, with the artificial data packet, the session identifier. This enables the data packet processing module to verify that the artificial data packet was obtained from the client device and to utilize the artificial IP address to identify the true recipient of the artificial data packet.

Figure 7:
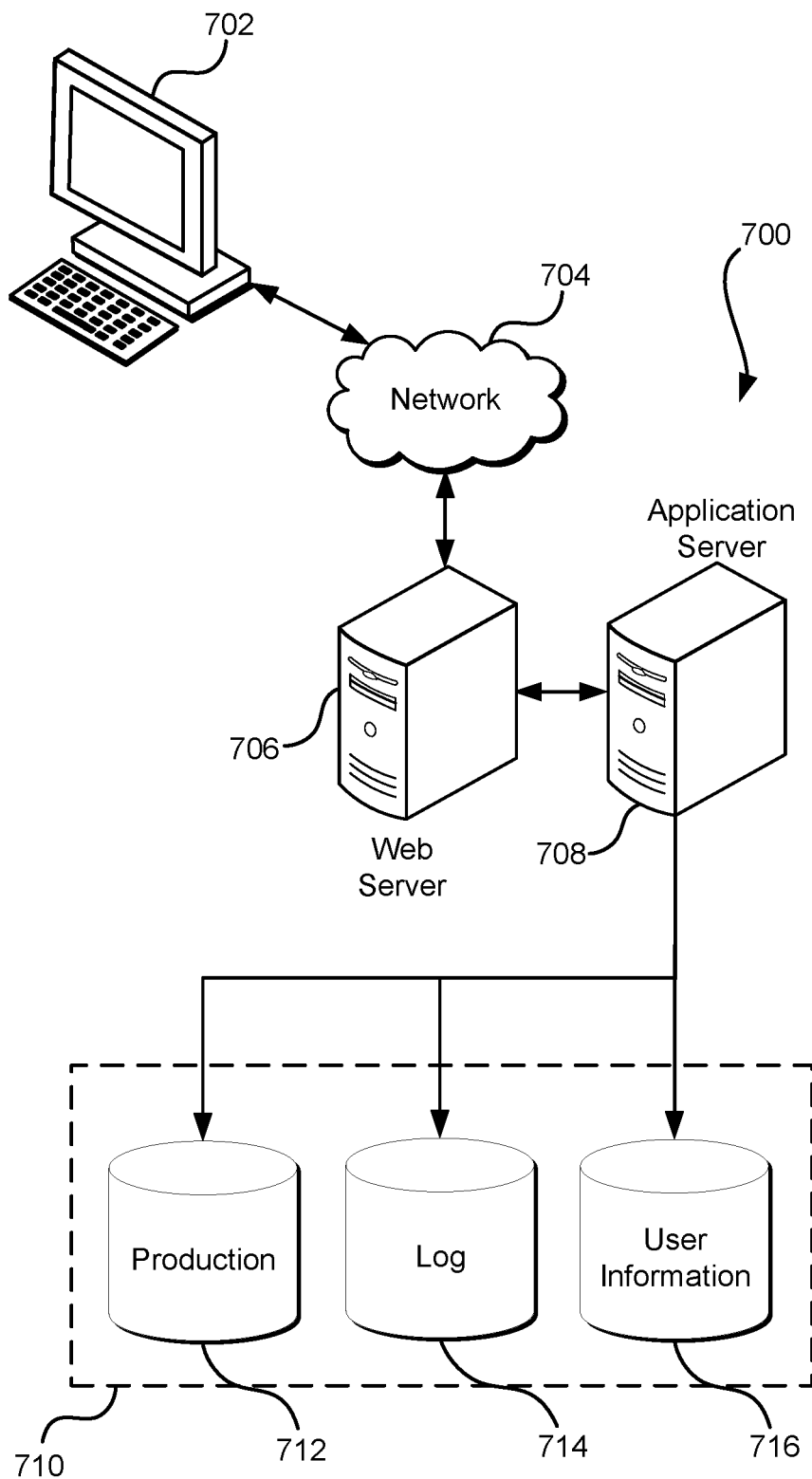
FIG. 7 shows an illustrative example of a system in which various embodiments can be implemented.

FIG. 7 illustrates aspects of an example system 700 for implementing aspects in accordance with an embodiment. As will be appreciated, although a web-based system is used for purposes of explanation, different systems may be used, as appropriate, to implement various embodiments. In an embodiment, the system includes an electronic client device 702, which includes any appropriate device operable to send and/or receive requests, messages, or information over an appropriate network 704 and convey information back to a user of the device. Examples of such client devices include personal computers, cellular or other mobile phones, handheld messaging devices, laptop computers, tablet computers, set-top boxes, personal data assistants, embedded computer systems, electronic book readers, and the like. The electronic client device 702 is similar to the client device described above in FIGS. 1-5. In an embodiment, the network includes any appropriate network, including an intranet, the Internet, a cellular network, a local area network, a satellite network or any other such network and/or combination thereof and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly-addressable communications network, as the system includes a web server 706 for receiving requests and serving content in response thereto, although for other networks an alternative device serving a similar purpose could be used as would be apparent to one of ordinary skill in the art.

In an embodiment, the illustrative system includes at least one application server 708 and a data store 710 and it should be understood that there can be several application servers, layers or other elements, processes or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object level interfaces. The application server can include any appropriate hardware, software and firmware for integrating with the data store as needed to execute aspects of one or more applications for the client device, handling some or all of the data access and business logic for an application.

In an embodiment, the application server provides access control services in cooperation with the data store and generates content including, but not limited to, text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including, but not limited to, forms that are perceptible to the user audibly, visually and/or through other senses. The handling of all requests and responses, as well as the delivery of content between the client device 702 and the application server 708, in an embodiment, is handled by the web server using PHP: Hypertext Preprocessor ("PHP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system. The application server 708 may be connected to the client device 702 via an encrypted data stream of a VPN, as described above.

The data store 710, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing production data 712 and user information 716, which are used to serve content for the production side. The data store also is shown to include a mechanism for storing log data 714, which is used, in an embodiment, for reporting, computing resource management, analysis or other such purposes. In an embodiment, other aspects such as page image information and access rights information (e.g., access control policies or other encodings of permissions) are stored in the data store in any of the above listed mechanisms as appropriate or in additional mechanisms in the data store 710.

The data store 710, in an embodiment, is operable, through logic associated therewith, to receive instructions from the application server 708 and obtain, update or otherwise process data in response thereto and the application server 708 provides static, dynamic, or a combination of static and dynamic data in response to the received instructions. In an embodiment, dynamic data, such as data used in web logs (blogs), shopping applications, news services, and other such applications are generated by server-side structured languages as described herein or are provided by a content management system ("CMS") operating on, or under the control of, the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the user device 702. Continuing with example, information for a particular item of interest is viewed in a dedicated page or window of the browser. It should be noted, however, that embodiments of the present disclosure are not necessarily limited to the context of web pages, but are more generally applicable to processing requests in general, where the requests are not necessarily requests for content. Example requests include requests to manage and/or interact with computing resources hosted by the system 700 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed (i.e., as a result of being executed) by a processor of the server, cause or otherwise allow the server to perform its intended functions.

The system 700, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 7. Thus, the depiction of the system 700 in FIG. 7 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols and such a system also includes a number of workstations running any of a variety of commercially-available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, software containers utilizing operating-system level virtualization and other virtual devices or non-virtual devices supporting virtualization capable of communicating via a network.

In an embodiment, a system utilizes at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that run one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C # or C++, or any scripting language, such as Ruby, PHP, Perl, Python or TCL, as well as combinations thereof. In an embodiment, the one or more servers also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above which can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood with the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two, but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, a non-transitory computer-readable storage medium store instructions and a main CPU execute some of the instructions while a graphics processor unit executes other instructions. In an embodiment, different components of a computer system have separate processors and different processors execute different subsets of the instructions.

Accordingly, in an embodiment, computer systems are configured to implement one or more services that singly or collectively perform operations of processes described herein and such computer systems are configured with applicable hardware and/or software that enable the performance of the operations. Further, a computer system that implement an embodiment of the present disclosure is a single device and, in another embodiment, is a distributed computer systems comprising multiple devices that operate differently such that the distributed computer system performs the operations described herein and such that a single device does not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
    generating an artificial data packet, the artificial data packet comprising out-of-band data of a session control channel to be processed for authentication and authorization of a user of a client device in a virtual private network, the client device communicably connected to a server of the virtual private network via a data stream;
    inserting, into a header of the artificial data packet, an artificial Internet Protocol (IP) address, the artificial (IP) address serving as an indicator to the server of the virtual private network that the artificial data packet comprises the out-of-band data; and
    transmitting the artificial data packet from the client device to the server over the data stream to the server to cause the server to determine, based on the artificial IP address, that the artificial data packet is to be processed by a computer system that processes the out-of-band data.

2. The computer-implemented method of claim 1, wherein the artificial IP address is selected from a database specifying a set of IP addresses selected by the client device and the server during a handshake process for establishing the virtual private network.

3. The computer-implemented method of claim 1, wherein the artificial data packet is transmitted over an encrypted data stream with other data packets, the other data packets specifying IP addresses corresponding to a domain server.

4. The computer-implemented method of claim 1, wherein the artificial IP address is inserted into the header as a source IP address corresponding to an artificial source of the out-of-band data.

5. A system, comprising:
    one or more processors; and
    memory that stores computer-executable instructions that, if executed, cause the one or more processors to:
        obtain a data packet from a client device over an encrypted data stream;
        identify, from a header of the data packet, a network destination of the data packet;
        evaluate the network destination of the data packet to determine whether the network destination of the data packet corresponds to an artificial network address that indicates presence of out-of-band data within the data packet; and
        as a result of a determination that the header includes the artificial network address that indicates the presence of the out-of-band data, utilize the out-of-band data from the data packet to authenticate a user of the client device.

6. The system of claim 5, wherein the computer-executable instructions that cause the one or more processors to evaluate the set of network addresses further cause the one or more processors to query a database of network addresses usable to indicate the presence of the out-of-band data to determine whether any of the set of network addresses include the network address.

7. The system of claim 5, wherein the data packet is obtained over an encrypted data stream, the encrypted data stream usable for transmissions of data packets comprising the out-of-band data and of data packets corresponding to other data channels.

8. The system of claim 5, wherein the network address is specified as the destination of the data packet in the header.

9. The system of claim 5, wherein the system and the client device are connected via a virtual private network.

10. The system of claim 5, wherein the computer-executable instructions further cause the one or more processors to:
obtain a second data packet from the client device;
determine that the second data packet specifies a second set of network addresses corresponding to a data channel for processing data other than the out-of-band data; and
transmit the second data packet to a server associated with a second destination network address specified in the second data packet.

11. The system of claim 5, wherein the network address corresponds to a session control channel for the processing of the out-of-band data.

12. The system of claim 5, wherein the network address is assigned from a set of IP addresses reserved for documentation purposes.

13. A non-transitory computer-readable storage medium comprising executable instructions that, as a result of being executed by one or more processors of a computer system, cause the computer system to at least:
establish a data stream between the computer system and a server;
obtain out-of-band data;
generate, in response to obtaining the out-of-band data, a data packet comprising the out-of-band data;
insert, into a header of the data packet, an artificial network address corresponding to a network channel for processing of the out-of-band data, the artificial network address; and
transmit, over the data stream between the computer system and the server, the data packet to cause the server to determine, based on the artificial network address, that the data packet comprises the out-of-band data.

14. The non-transitory computer-readable storage medium of claim 13, wherein the instructions further cause the computer system to select the network address from a set of network addresses reserved for documentation purposes.

15. The non-transitory computer-readable storage medium of claim 14, wherein the set of network addresses are specified in a database of network addresses, the database of network addresses generated via a handshake process between the computer system and the server.

16. The non-transitory computer-readable storage medium of claim 13, wherein the instructions further cause the computer system to transmit, over the data stream, another data packet comprising data other than the out-of-band data, whereby the other data packets specify network addresses other than the network channel for the processing of the out-of-band data.

17. The non-transitory computer-readable storage medium of claim 13, wherein the network address is inserted into the header by specifying the network address as a destination Internet Protocol address for the data packet.

18. The non-transitory computer-readable storage medium of claim 13, wherein the instructions that cause the computer system to insert the network address corresponding to the network channel for processing of the out-of-band data into the header further cause the computer system to insert a digital signature into the data packet, the digital signature usable by the server to authenticate that insertion of the network address into the header was performed by the computer system.

19. The non-transitory computer-readable storage medium of claim 13, wherein the out-of-band data is obtained from an agent application of the computer system, the agent application usable to interact with the server to maintain the network channel for processing of the out-of-band data between the computer system and the server.

20. The non-transitory computer-readable storage medium of claim 13, wherein the out-of-band data comprises credential information usable by the server to authenticate a user of the computer system.

* * * * *